United States Patent [19]
Lippel

[11] Patent Number: 5,148,273
[45] Date of Patent: Sep. 15, 1992

[54] TELEVISION SYSTEMS TRANSMITTING DITHER-QUANTIZED SIGNALS

[75] Inventor: Bernard Lippel, West Long Branch, N.J.

[73] Assignee: Quanticon Inc., West Long Branch, N.J.

[21] Appl. No.: 461,009

[22] Filed: Jan. 4, 1990

Related U.S. Application Data

[63] Continuation-in-part of Ser. No. 282,471, Dec. 9, 1988, abandoned, and a continuation-in-part of Ser. No. 180,344, Dec. 13, 1988, abandoned, which is a continuation-in-part of Ser. No. 779,254, Sep. 23, 1985, Pat. No. 4,758,893.

[51] Int. Cl.$^5$ .............................................. H04N 7/13
[52] U.S. Cl. .................................................... 358/138
[58] Field of Search ................... 358/13, 133, 138, 160

[56] References Cited

U.S. PATENT DOCUMENTS

| | | | |
|---|---|---|---|
| 3,739,082 | 6/1973 | Lippel | 358/138 |
| 4,143,724 | 3/1979 | Itani | 341/131 |
| 4,447,803 | 5/1984 | Crosby et al. | 341/131 |
| 4,758,893 | 7/1988 | Lippel | 358/37 |

Primary Examiner—John W. Shepperd

[57] ABSTRACT

Television systems that transmit dither-quantized samples for psychovisually compressed signalling are improved by substituting novel multi-phase dithers of the invention for previously known multi-phase dithers. The improved dithers comprise ordered-dither frame patterns and typically have sixteen or eight phases and sixteen sizes of dither samples. A first variety, not self-interpolating, merely shifts the frame-pattern structure from frame-to-frame. Methods and means are disclosed for generating novel self-interpolating dithers with sixteen or eight phases, including preferred dithers. Self-interpolating dithers are generally superior and they also facilitate receiver display of more quantum levels than actually transmitted.

20 Claims, 5 Drawing Sheets

```
 0 11 12  7      11 12  7  0       5  2  9 14      15  4  3  8
14  5  2  9       5  2  9 14       8 15  4  3       1 10 13  6
 3  8 15  4       8 15  4  3       6  1 10 13      12  7  0 11
13  6  1 10       6  1 10 13      11 12  7  0       2  9 14  5
  Frame #1         Frame #2         Frame #3         Frame #4

1 10 13  6      10 13  6  1       4  3  8 15      13  6  1 10
12  7  0 11       7  0 11 12      10 13  6  1       0 11 12  7
 2  9 14  5       9 14  5  2       7  0 11 12      14  5  2  9
15  4  3  8       4  3  8 15       9 14  5  2       3  8 15  4
  Frame #5         Frame #6         Frame #7         Frame #8

3  8 15  4       8 15  4  3       6  1 10 13      12  7  0 11
13  6  1 10       6  1 10 13      11 12  7  0       2  9 14  5
 0 11 12  7      11 12  7  0       5  2  9 14      15  4  3  8
14  5  2  9       5  2  9 14       8 15  4  3       1 10 13  6
  Frame #9        Frame #10        Frame #11        Frame #12

2  9 14  5       9 14  5  2       7  0 11 12      14  5  2  9
15  4  3  8       4  3  8 15       9 14  5  2       3  8 15  4
 1 10 13  6      10 13  6  1       4  3  8 15      13  6  1 10
12  7  0 11       7  0 11 12      10 13  6  1       0 11 12  7
 Frame #13        Frame #14        Frame #15        Frame #16
```

FIG. 1

```
 0 11 12  7      13  6  1 10       6 13 10  1      11  0  7 12
14  5  2  9       3  8 15  4       8  3  4 15       5 14  9  2
 3  8 15  4      14  5  2  9       5 14  9  2       8  3  4 15
13  6  1 10       0 11 12  7      11  0  7 12       6 13 10  1
  Frame #1         Frame #2         Frame #3         Frame #4

2  9 14  5      15  4  3  8       5 14  9  2       8  3  4 15
12  7  0 11       1 10 13  6      11  0  7 12       6 13 10  1
 1 10 13  6      12  7  0 11       6 13 10  1      11  0  7 12
15  4  3  8       2  9 14  5       8  3  4 15       5 14  9  2
  Frame #5         Frame #6         Frame #7         Frame #8

1 10 13  6      12  7  0 11       7 12 11  0      10  1  6 13
15  4  3  8       2  9 14  5       9  2  5 14       4 15  8  3
 2  9 14  5      15  4  3  8       4 15  8  3       9  2  5 14
12  7  0 11       1 10 13  6      10  1  6 13       7 12 11  0
  Frame #9        Frame #10        Frame #11        Frame #12

3  8 15  4      14  5  2  9       4 15  8  3       9  2  5 14
13  6  1 10       0 11 12  7      10  1  6 13       7 12 11  0
 0 11 12  7      13  6  1 10       7 12 11  0      10  1  6 13
14  5  2  9       3  8 15  4       9  2  5 14       4 15  8  3
 Frame #13        Frame #14        Frame #15        Frame #16
```

```
                        AUGEND
          0  1  2  3  4  5  6  7  8  9 10 11 12 13 14 15
        ┌─────────────────────────────────────────────────
      0 │  0  1  2  3  4  5  6  7  8  9 10 11 12 13 14 15
      1 │  1  0  3  2  5  4  7  6  9  8 11 10 13 12 15 14
      2 │  2  3  0  1  6  7  4  5 10 11  8  9 14 15 12 13
      3 │  3  2  1  0  7  6  5  4 11 10  9  8 15 14 13 12
      4 │  4  5  6  7  0  1  2  3 12 13 14 15  8  9 10 11
A     5 │  5  4  7  6  1  0  3  2 13 12 15 14  9  8 11 10
D     6 │  6  7  4  5  2  3  0  1 14 15 12 13 10 11  8  9
D     7 │  7  6  5  4  3  2  1  0 15 14 13 12 11 10  9  8
E     8 │  8  9 10 11 12 13 14 15  0  1  2  3  4  5  6  7
N     9 │  9  8 11 10 13 12 15 14  1  0  3  2  5  4  7  6
D    10 │ 10 11  8  9 14 15 12 13  2  3  0  1  6  7  4  5
     11 │ 11 10  9  8 15 14 13 12  3  2  1  0  7  6  5  4
     12 │ 12 13 14 15  8  9 10 11  4  5  6  7  0  1  2  3
     13 │ 13 12 15 14  9  8 11 10  5  4  7  6  1  0  3  2
     14 │ 14 15 12 13 10 11  8  9  6  7  4  5  2  3  0  1
     15 │ 15 14 13 12 11 10  9  8  7  6  5  4  3  2  1  0
```

FIG. 4
Prior Art

```
 0 11 12  7       8  3  4 15       4 15  8  3      12  7  0 11
14  5  2  9       6 13 10  1      10  1  6 13       2  9 14  5
 3  8 15  4      11  0  7 12       7 12 11  0      15  4  3  8
13  6  1 10       5 14  9  2       9  2  5 14       1 10 13  6
   Frame #1         Frame #2          Frame #3         Frame #4

2  9 14  5      10  1  6 13       6 13 10  1      14  5  2  9
12  7  0 11       4 15  8  3       8  3  4 15       0 11 12  7
 1 10 13  6       9  2  5 14       5 14  9  2      13  6  1 10
15  4  3  8       7 12 11  0      11  0  7 12       3  8 15  4
   Frame #5         Frame #6          Frame #7         Frame #8

1 10 13  6       9  2  5 14       5 14  9  2      13  6  1 10
15  4  3  8       7 12 11  0      11  0  7 12       3  8 15  4
 2  9 14  5      10  1  6 13       6 13 10  1      14  5  2  9
12  7  0 11       4 15  8  3       8  3  4 15       0 11 12  7
   Frame #9        Frame #10         Frame #11        Frame #12

3  8 15  4      11  0  7 12       7 12 11  0      15  4  3  8
13  6  1 10       5 14  9  2       9  2  5 14       1 10 13  6
 0 11 12  7       8  3  4 15       4 15  8  3      12  7  0 11
14  5  2  9       6 13 10  1      10  1  6 13       2  9 14  5
   Frame #13       Frame #14         Frame #15        Frame #16
```

TELEVISION SYSTEMS TRANSMITTING DITHER-QUANTIZED SIGNALS

This application is a continuation-in-part of my copending application, Ser. No. 282,471, filed Dec. 9, 1988 (now abandoned), and a continuation-in-part of Ser. No. 180,344 filed Dec. 13, 1988 (now abandoned), which is a continuation-in-part of Ser. No. 779,254, filed Sep. 23, 1985 now U.S. Pat. No. 4,758,893.

SUMMARY

The invention concerns television systems that transmit dither-quantized samples, including systems of the copending application Ser. No. 527,275, filed May 5, 1990 and of U.S. Pat. No. 4,758,893 as well as those of related prior art. The systems are improved by substituting novel multiphase dithers of the invention for previously known dithers. Rules sufficient for the construction of dithers of the invention are shown herein and examples, including preferred examples, are shown.

The improved dithers of the present invention comprise ordered-dither frame patterns and typically have sixteen or eight phases and sixteen sizes of dither. Whereas a first variety shifts a fixed pattern of dither sizes spatially relative to the TV picture but is not self-interpolating, a second variety is characteristically self-interpolating and the pattern of sizes may be reflected from frame to frame. Although methods and means of U.S. Pat. No. 4,758,893 are generally not convenient for generation of these varieties, convenient novel alternatives are disclosed herein. Self-interpolating dithers are especially useful in the systems of my copending application, Ser. No. 527,275.

DRAWINGS

FIG. 1 shows a set of nasik dither matrices defining a 16-phase dither that produces continuous size-tracks that are similar for all dither sizes.

FIG. 3 shows a set of nasik dither matrices defining a self-interpolating 16-phase dither characterized by continuous size-tracks.

DETAILED DISCLOSURE

General

Terminology used herein incorporates to applicable terminology of U.S. Pat. No. 4,758,893. The latter discloses use of various species of multi-phase dithers, each dither a signal comprising a one-dimensional stream of dither samples restricted Q sizes. The dither sizes are arranged in a repeating sequence, the sequence being divisible into p phases, each phase corresponding to a frame pattern.

Figure 7:
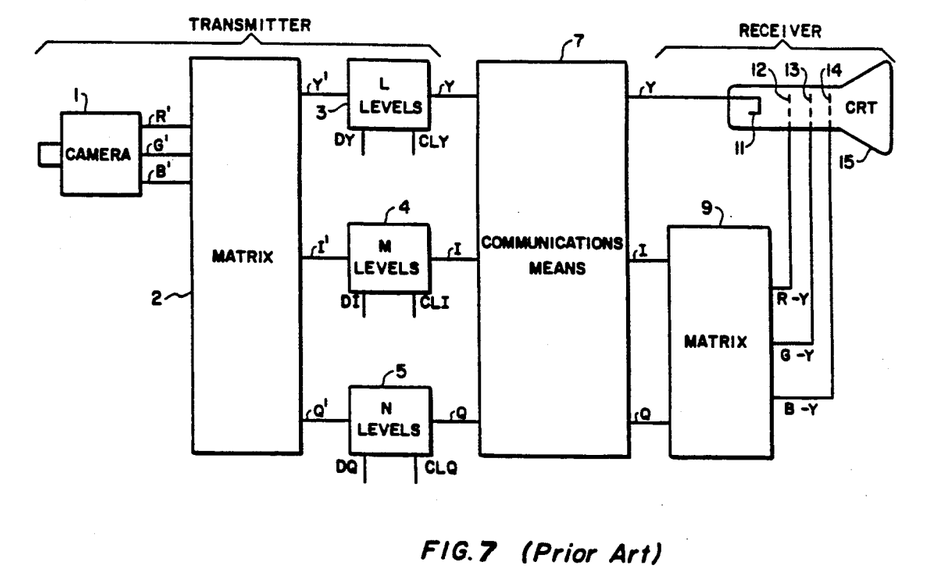
FIG. 7 is of the prior art and shows an exemplary system transmitting dither-quantized television signals.

The present invention improves various systems of prior art transmitting or recording analog or digital television signals that have been dither-quantized so that only quantum values of amplitude are sent. FIG. 7 (substantially the same as FIG. 1 of U.S. Pat. No. 4,652,905) exemplifies some of the prior-art systems to which the invention pertains. Luminance component Y', and chrominance components I' and Q' from matrix 2 are respectively dither-quantized in quantizers 3, 4 and 5 before transmission by communications means 7 to a TV receiver. Dither-quantizing includes combining a dither (e.g. DY) with a video component (e.g. Y') and quantizing the combined signal to a limited number of specified amplitude levels (as in producing Y). CLY is a strobe pulse.

All of the novel dithers disclosed herein comprise ordered-dither frame patterns. We conveniently specify a frame pattern by means of a dither matrix and specify a p-phase dither by means of an ordered set of p dither matrices. Successive matrix transformations change the arrangement of dither sizes on the matrix and hence change successive frame patterns.

Many of the dithers disclosed herein incorporate a 4×4 pandiagonal magic square (called a nasik) as the dither matrix and are referred to as nasik dithers. There are two main categories of 4×4 nasiks typified by

| Type I | | | | | Type II | | | |
|---|---|---|---|---|---|---|---|---|
| 0 | 11 | 12 | 7 | and | 0 | 13 | 10 | 7 |
| 14 | 5 | 2 | 9 | | 14 | 3 | 4 | 9 |
| 3 | 8 | 15 | 4 | | 5 | 8 | 15 | 2 |
| 13 | 6 | 1 | 10 | | 11 | 6 | 1 | 12 |

Logical addition of a constant addend to all elements of either of the above matrices interchanges rows and/or columns. The resultant transformation may include matrix reflection about horizontal and/or vertical axes as well as pattern shifts; however the matrix remains a pandiagonal magic-square of the same category. A multiphase dither realized in terms of one nasik category usually has an equivalent in terms of the other category. It is known that a nasik frame pattern can be oriented to avoid large-area flicker in TV systems having 2:1 interlaced scanning, while 90° rotation from such orientation promotes flicker. Nasiks are therefore shown herein with suitable orientation for horizontal scanning with interlace, and the disclosed transformations avoid 90° rotations.

Translated Frame Patterns

The sixteen nasik matrices of FIG. 1 exemplify dithers of a first embodiment of the invention. The frame pattern merely shifts translationally from frame to frame so that all dither sizes maintain their relative positions; furthermore, the shifts are such that, each individual size moves horizontally, vertically or diagonally into a next-adjacent pels position of the TV raster during one change of frame and every pel receives all 16 dither sizes in the course of the 16-phase dither cycle. Micropatterns in the stipple that renders non-quantum shades of gray on the TV display are translated correspondingly from frame to frame.

Figure 2:
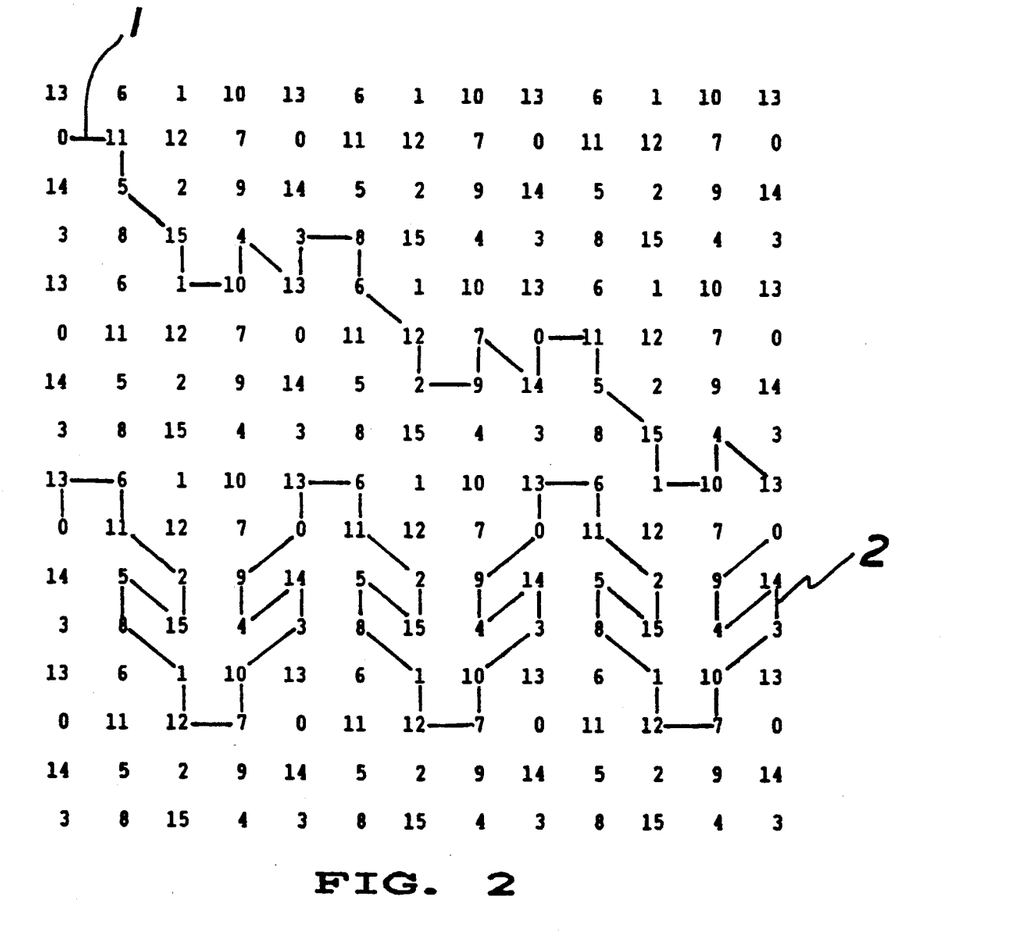
FIG. 2 represents a portion of the tiled continuum formed by replicating a Type I nasik dither matrix horizontally and vertically. The size-0 tracks of two different dithers are shown thereon.

FIG. 2 represents part of an indefinitely extended 2-dimensional array (continuum) on which the dither matrix for any particular frame of FIG. 1 is continually replicated horizontally and vertically. Whereas a one-dimensional sequence of dither samples is employed to dither-quantize a TV signal in the system of FIG. 7, it will be apparent to persons skilled in the art that, in order to generate a continuously translated dither like that of FIG. 1 for such a system, I may first store in addressable memory means a 2-dimensional array similar to FIG. 2 and larger than the TV frame in dimensions. For each phase of the dither, I may then scan sequentially the elements of a different subarray corresponding to a different one of the frame patterns, using a consistent scanning pattern. Assuming that scanning for Frame 1 commences with size 0, scanning for each subsequent frame commences at the next one of a series of index sizes that form a broken line connecting only horizontally, vertically, or diagonally adjacent elements of the stored array (e.g. line 1 of FIG. 2).

A translational multiphase dither is completely defined by the matrix for Frame #1 (a Type I nasik matrix in the case of FIG. 1) and a sequence of index sizes. The sequence of index sizes for FIG. 1 is as follows:

0,11 5,15,1,10,4,13,3,8,6,12,2,9,7,14

Whereas 16-phase dither is shown in FIG. 1, we can obtain 8-phase dither by returning to Frame 1 after Frame 8, or we could return after Frame 4 for 4-phase dithering. I have found, however, that sixteen phases generally insures better picture quality with very little additional cost in apparatus or complexity of operation.

Methods disclosed in U.S. Pat. No. 4,758,893 for using arithmetic addition, modulo a radix, to repeatedly transform a first frame pattern to produce the remaining frame patterns of a multiphase dither, are not convenient for generating the dithers exemplified in FIG. 1.

Self-Interpolating Dithers

The dithers exemplified by FIG. 1 lack a desirable property, called herein self-interpolation, that is found in some prior-art dithers as well as other dithers disclosed hereinbelow. Wherever the intensity of an input component (e.g. Y', I' or Q' of FIG. 7) differs sufficiently from a quantum level of the associated quantizer, the corresponding dither-quantized signal of the invention (e.g. Y, I, or Q) alternates between two adjacent quantum levels, so that a pattern of dots, called stipple, is displayed by a a TV receiver. constant input over the entire display raster, dither quantizing with a uniform quantizer, and 16-phase dither. Then self-interpolation acts as follows: When the input signal exceeds a quantum level by half the quantizer step size (so that the stipple on any one frame comprises 50% lighter dots and 50% darker dots), the stipple patterns from any two successive TV frames (phases) interleave perfectly, so that every dot of the stipple becomes brighter exactly once and darker exactly once, corresponding to uniform average luminance; when the excess input is one-fourth the step size, the stipple patterns from any four successive frames interleave perfectly, every element becoming brighter once and darker three times, producing a uniform luminance when averaged over four frames; likewise, the stipple patterns produced from excess of one-eighth step interleave perfectly during eight successive frames, and excess of one-sixteenth step interleaves perfectly in the course of 16 frames.

My copending application, Ser. No. 527,275, discloses means whereby a video signal quantized with a self-interpolating dither can be requantized to approximate the same video originally quantized with a significantly larger number of quantum levels and multiphase dither. Even in the absence of such requantizing, self-interpolation tends to reduce the visibility of artifacts displayed on the TV receiver of FIG. 7.

Self-Interpolation with Continuous Size-Tracks

Another embodiment of the invention employs a class of dithers exemplified in FIG. 3. These are self-interpolating dithers also characterized by movement of sizes on continuous tracks. The sizes do not shift in concert, however—some move in one direction as others move in other directions.

Referring to FIG. 3, Frame 1 is the same as Frame 1 of FIG. 1, but the subsequent frames are not merely shifted—the transformations involve transposition of adjacent pairs of rows and/or columns of the Frame 1 matrix, equivalent to reflection of the nasik continuum about horizontal and/or vertical axes.

Figure 4:
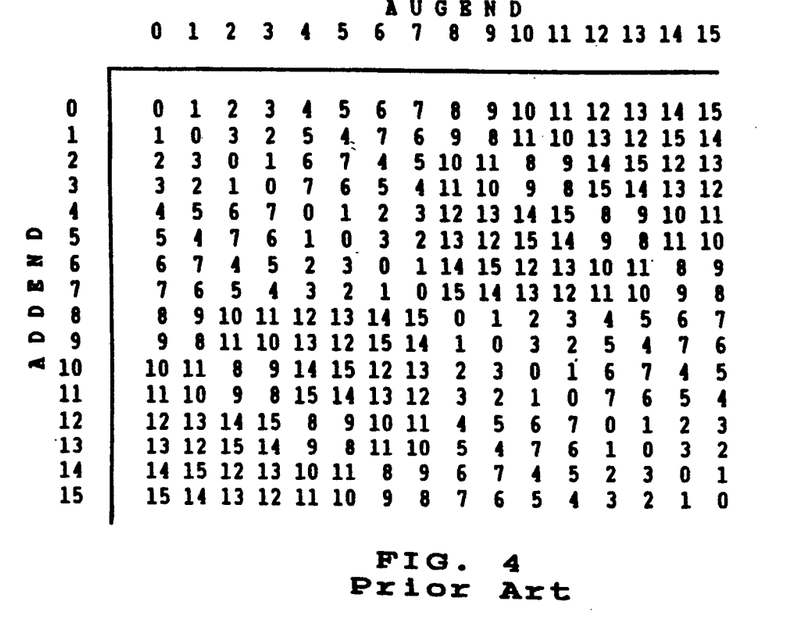
FIG. 4 is a table giving the logical binary sum of two numbers each between 0 and 15 inclusive.

A convenient method for construction of a self-interpolating 16-phase ordered dither is transformation of a first matrix into fifteen subsequent matrices by logical binary addition of the numbers 0 to 15, the order of said numbers (addends) conforming to rules disclosed hereinbelow. Each addend transforms every element of said first matrix. FIG. 4 shows a table (of prior art) for logical addition of two numbers from 0 to 15; it is derived by writing the augend and addend numbers in binary notation, adding binary digits without carries, and converting the result back to decimal form. Addition of the binary digits without carries is equivalent to EXCLUSIVE-OR combination of each pair of addend and augend digits that have equal binary weight.

The series of logical addends for FIG. 3 is 0,13,6,11,2,15,5,8,1,12,7,10,3,14,4,9

Because this series of addends happens to make a continuous track on the nasik continuum, the size-tracks are continuous. The addends track labelled 2 on FIG. 2 is also the track of size 0. Although the remaining sizes also follow continuous tracks, some sizes maintain a fixed position relative to 0 and other sizes (1, for example) move in contrary directions.

Another example of this kind of dither is specified by the Type II nasik, instead of Type I, and the following sequence of addends:

0,11,5,14,2,9,7,12,1,10,4,15,3,8,6,13.

In similar fashion, a rectangular ordered-dither matrix of prior art, namely

| 0 | 11 | 2 | 9 |
|---|----|---|---|
| 13 | 6 | 15 | 4 |
| 1 | 10 | 3 | 8 |
| 12 | 7 | 14 | 5, | together with the addends sequence 0,11,6,15,2,9,4,13,1,10,7,14,3,8,5,12 is sufficient for another self-interpolating dither with continuous size tracks.

Finally, the dither specified by the matrix

| 0 | 11 | 6 | 13 |

| | | | |
|---|---|---|---|
| 15 | 4 | 9 | 2 |
| 3 | 8 | 5 | 14 |
| 12 | 7 | 10 | 1 | and the addends sequence 0,11,6,13,2,9,5,14,1,10,7,12,3,8,4,15 exemplifies self-interpolation with continuous size-tracks, all tracks being confined to one closed figure.

Addend Sequences for Self-Interpolation

As mentioned previously, successive dither matrices corresponding to self-interpolating multi-phase dithers of the invention can be constructed by 1) selecting a first matrix, 2) choosing an ordered set of numbers (addends) according to certain rules, and 3) generating subsequent matrices by modifying said first matrix according to each consecutive addend in turn. Recalling that the elements of a matrix are numbers corresponding to dither sizes, a matrix is modified by replacing each matrix element by the logical binary sum of itself and the addend. For sixteen (or fewer) phases and sixteen (or fewer) sizes, FIG. 4 presents a table showing the logical binary sum of two numbers, each between 0 and 15 inclusive.

The following rules are sufficient for addends producing a 16-phase self-interpolating ordered dither: Let the letters

A,B,C,D,E,F,G,H,I,J,K,L,M,N,O,P designate the required sequence of sixteen addends. Those skilled in the art will understand that the sequence repeats cyclically and that it may be read in reversed order. Then:

a) $A=0$, $E=2$, $I=1$, $M=3$ b) The set C,G,K,O corresponds to any consecutive set of four numbers, read either left-to-right or right-to-left, from the series 4,6,5,7,4,6,5,7.

c) Either Option 1 or Option 2 applies.

Option 1) The set B,F,J,N corresponds to any consecutive set of four numbers, read either way, from the series 8,10,9,11,8,10,9,11; and the set D,H,L,P is taken likewise from 12,14,13,15,12,14,13,15.

Option 2) The set D,H,L,P corresponds to any consecutive set of four numbers, read either way, from the series 8,10,9,11,8,10,9,11; and the set B,F,J,N is taken likewise from 12,14,13,15,12,14,13,15.

These rules insure that any 4×4 first matrix comprising sizes in the range 0 to 15 inclusive is transformed by the addends into an ordered series of matrices sufficient for a 16-phase self-interpolating dither.

Any consecutive set of eight from the set of sixteen addends is sufficient to provide an 8-phase self-interpolating dither and a consecutive set of four provides 4-phases.

Persons skilled in the art will understand that decimal notation is used to specify dither sizes and addends for convenience, and that specification and computation of dither sizes can also be done with equivalent binary or other-radix numbers without departing from the spirit of the invention. It will likewise be understood that, although the cyclic sequence of addends is conveniently written commencing with 0, the choice of first addend, corresponding to a first phase, is arbitrary inasmuch as the sequence of frame patterns repeats cyclically.

Cononical Sequence of Addends

Dithers for a preferred embodiment of the invention are generated by the following sequence of logical addends:

0,8,4,12,2,10,6,14,1,9,5,13,3,11,7,15.

This sequence can also be derived by writing the binary numbers from 0000 through 1111 in natural sequence, then reversing the order of bit positions before converting to decimal notation.

Figure 5:
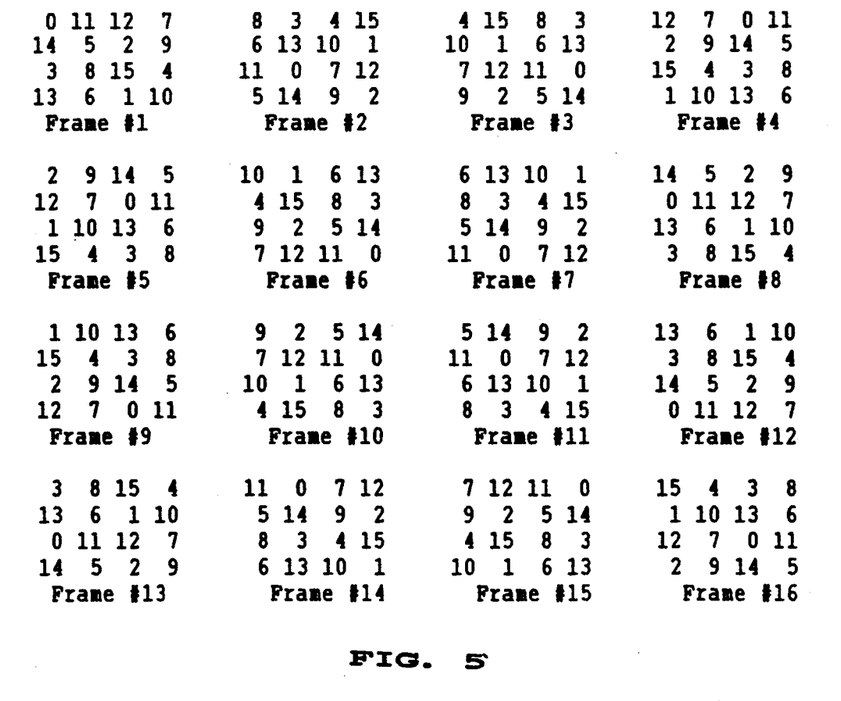
FIG. 5 shows a set of nasik dither matrices corresponding to a preferred self-interpolating dither.

FIG. 5 shows such a dither with Type I nasik frame patterns. A related dither has the Type II nasik matrix, but nasik frame patterns are not essential for self-interpolation.

Frames 1 to 4 of FIG. 5 are also the frames of a 4-phase dither called 3-d nasik dither in U.S. Pat. No. 4,568,966 and related patents and first disclosed in U.S. Pat. No. 3,739,082. The latter patent discloses nasik dithers respectively corresponding to Frames #1 and #2, and Frames #1–#4, of FIG. 5 and states (col. 12, lines 36–41) that additional circuitry may provide "an even longer sequence of alternating dither patterns". Only nasik frame patterns are disclosed, whereas self-interpolating dithers of the present invention need not be nasik dithers and need not correspond to the canonical sequence of addends.

Generating Means for Self-Interpolating Dithers

Figure 6:
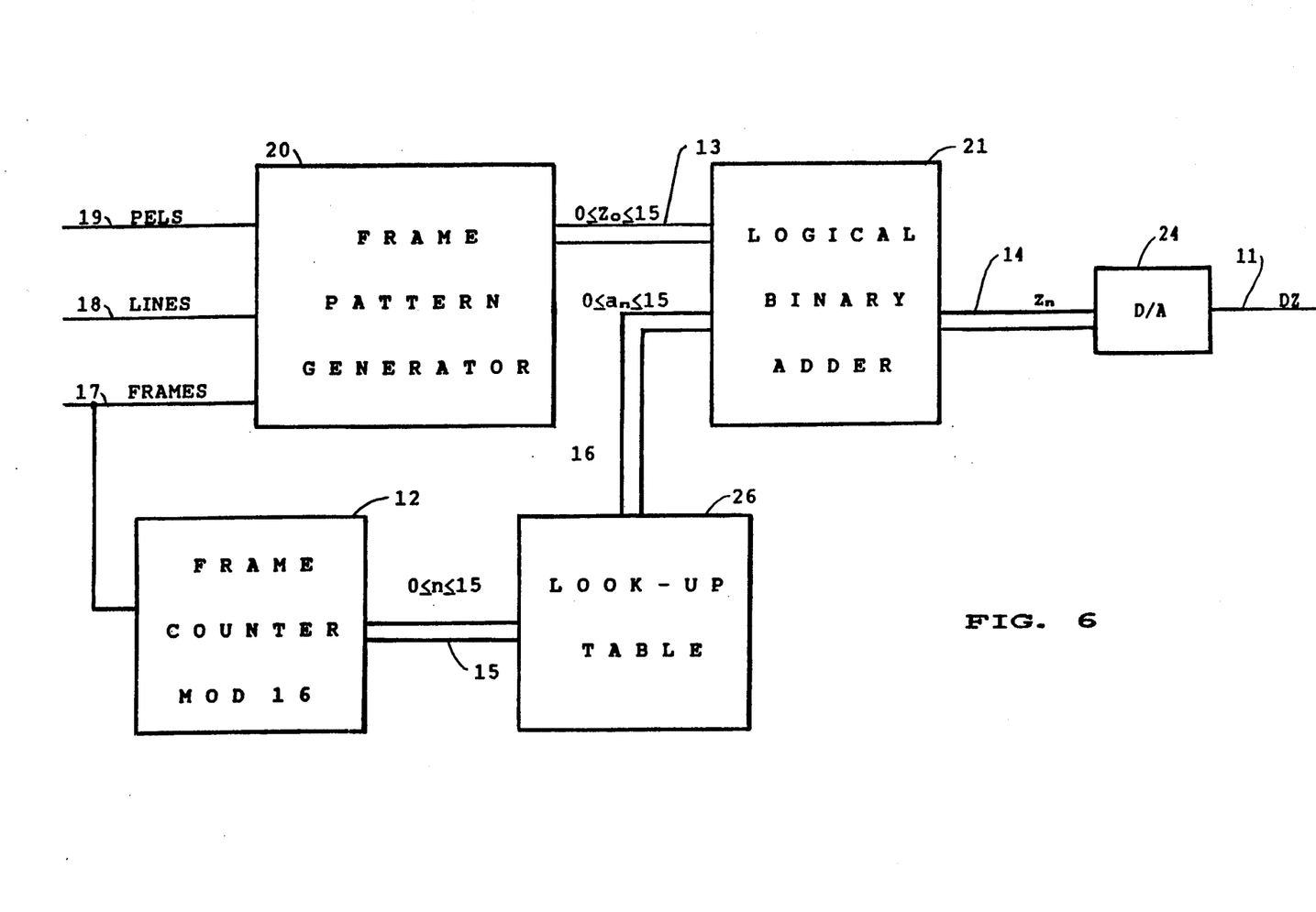
FIG. 6 shows schematically means using one frame pattern and a set of logical addends to generate a self-interpolating multiphase dither.

FIG. 6 shows exemplary means for producing a stream of dither samples corresponding to a self-interpolating multiphase ordered dither of the invention. The figure differs from FIG. 12 of U.S. Pat. No. 4,758,893 (not deemed practical for dithers of the invention) in that the latter shows transformation of a first frame pattern into other frame patterns by arithmetic addition modulo a radix, whereas FIG. 6 shows transformation by logical binary addition.

Referring to FIG. 6, double lines are used for connections transmitting digital signals and single lines for those transmitting analog or sync signals. Frame sync 17, lines sync 18 and pels clock 19 may be obtained from a TV scanning generator (not shown) in accordance with prior art. Ordered dither generator 20, of prior art, generates a stream of dither samples that corresponds to a first frame pattern and is repeated from frame to frame in synchronism with frame sync 17.

Counter 12 counts frame syncs (hence frames) modulo-16 and the count n goes to look-up table 26. An addend $a_n$ put out from table 26 is related to n according to the disclosed rules for addends producing self-interpolating 16-phase dithers.

Each dither sample $z_0$ from generator 20 is operated upon with the current addend $a_n$ in means 21, which may operate with the function table of FIG. 4 or by equivalent means producing binary logical addition. When the numerical value of the addend is 0, $z_n$ from unit 21 is the same as $z_0$; but at all other times, the sizes are rearranged as required for various frame patterns. Clock 19 insures that dither samples $z_0$ from generator 20, and dither samples $z_n$ from means 21, are synchronous with sampling of pels on the TV raster.

Generation of Dithers Having Translated Frame Patterns

Figure 8:
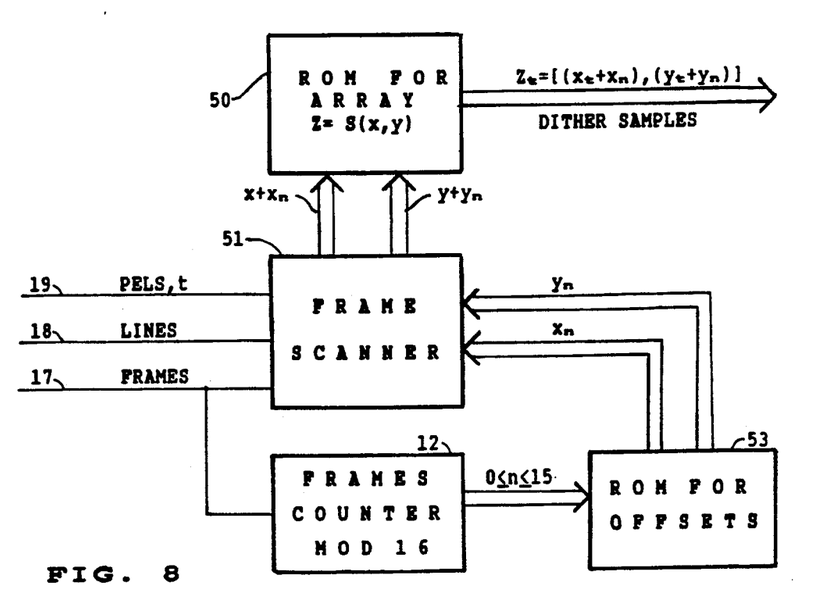
FIG. 8 is a schematic drawing showing means for generating a dither having translated frame patterns.

FIG. 8 shows a means for generating multiphase dithers having translated frame patterns, wherein all sizes move in concert. Frames sync 17, lines sync 18, and pels clock 19 of FIG. 8 are similar to the corresponding units of FIG. 6 and double lines signify digital signal paths. Assuming that a 16-phase dither comprising 16 dither sizes is to be generated, frame counter 12 counts frames modulo 16 and corresponding to each frames count n, and Read Only Memory 53 (ROM 53), delivers two predetermined offset numbers, $X_n$ and $Y_n$, each between 0 and 15, inclusive.

ROM 50 stores a predetermined pattern of dither samples having sizes from 0 to 15 inclusive on a 2-dimensional array corresponding to (x,y) addresses; the number of x-addresses is not less than the number of pels on a line of the TV frame plus the maximum $x_n$, and the number of y-addresses is not less than the number of lines on the frame plus the maximum $y_n$.

Frame scanner 51 and the array on ROM 50 are so arranged that, when $x_n$ and $y_n$ are both zero, the addresses $(x_t, y_t)$ are scanned to emulate raster scanning of the TV frame for successive values of the pels count t; the scanned elements of the 2-dimensional array correspond to a particular frame pattern of the dither coextensive with the TV frame, and the one-dimensional output $z_t$ from ROM 50 corresponds to one phase of the dither.

It will be obvious to persons skilled in the art that, inasmuch as the array stored in 50 is sufficiently larger than the frame, other frame patterns (obtained with at least one non-zero offset) will be laterally, vertically or diagonally displaced from said particular pattern according to the offset values, and the one-dimensional dither is modified accordingly from phase to phase.

Ordered dither frame patterns are generated when the oversize array stored in 50 is ordered (like FIG. 2) and continuous size paths occur when the successive offset pairs are arranged suitably in ROM 53. Specifically, the 16 successive offset pairs should correspond to the different elements of a 4×4 array, and successive pairs should be adjacent.

It will be obvious to persons skilled in the art that I may employ the means of FIG. 8 to generate a set of dither matrices such the matrices of FIG. 3 or FIG. 5 in a manner analogous to the generation of frame patterns.

Persons skilled in the art will understand that FIG. 6 is exemplary and that, within the spirit of the invention, equivalent means can be used to produce specific dithers having the same structures as would be produced by the means of FIG. 6. Furthermore, it will be recognized that a dither of the invention (or iterated portions thereof) may conveniently be recorded in a memory device, so that the stream of dither samples required by a TV transmitter of the invention is obtained in practice by readout from memory.

Additional Comments

Whereas sequences of addend or track positions have been written as simple series, it should be understood that any such series repeats continually to provide a continuous stream of dither samples comprising cyclically repeating phases.

Any continuous subsequence of eight addends extracted from the cycle of sixteen addends defining a 16-phase self-interpolating dither is sufficient for a new addends cycle which defines an 8-phase dither that is self-interpolating for sequences of two, four and eight frames.

Obtain a sequence of addends by reading Array A or an equivalent array, either left to right and top to bottom or right to left and top to bottom. It will be apparent that reading all such arrays, in both directions of line scan, is sufficient to provide the same totality of cyclic sequences as the rules disclosed above.

While I have disclosed the invention in terms of specific embodiments, other, equivalent embodiments will no doubt be obvious to persons having normal skill in the art and it is intended that the invention be construed to include all such equivalent modifications. For example, although I have explained and exemplified the invention by means of particular ordered dithers based on 4×4 dither matrices and sixteen, eight or four phases, design parameters that correspond to integral powers of the number 2, the persons skilled in the art will understand that I may provide equivalent dithers correspondingly related to 3, 5 or another number.

I claim:

1. A system for transmitting television information comprising:
   means for deriving a signal corresponding to a video component;
   means for producing a stream of dither samples corresponding to a multiphase dither wherein the frame patterns for two successive frames are identical except for relative displacement of the patterns horizontally, vertically, or diagonally with magnitude equal to the corresponding horizontal, vertical or diagonal spacing between pels on the scanning raster;
   means for combining dither samples of said stream with samples of said video component; and
   means for quantizing the combined signal according to discrete quantum levels.

2. The system of claim 1 including means for producing a stream of dither samples corresponding to multiphase ordered dither so that identical dither matrices are displaced between frames.

3. Means for producing a multi-phase dither comprising:
   means for storing information corresponding to an ordered set of numbers;
   means for generating a sequence of dither samples corresponding to a single phase of the dither and for causing said sequence to repeat cyclically; and
   means whereby all dither samples of one phase are associated with one number of said ordered set and the sizes of said samples are altered according to logical binary addition of said one number.

4. The means of claim 3 storing information corresponding to the ordered set 0,8,4,12,2,10,6,14,1,9,5,13,3,11,7,15 or any cyclic rearrangement thereof.

5. Means for generating a multiphase dither suitable for dither-quantizing a television signal, comprising:
   a) means generating a stream of signals representing a continually repeated series of dither samples, said series comprising P phases, said signals indicating one of Q discrete sizes for each dither sample, p and Q integers, samples of a first phase having sizes arranged in a certain order corresponding to an arbitrary first frame pattern;
   b) means for synchronizing successive phases with successive frames of said television signal; and c) means, including means for transforming according to logical binary addition, modifying the signals of said first phase to produce, for other phases, signals corresponding to frame patterns other than said first frame pattern.

6. The means of claim 5 including means for generating signals representing a set of addend numbers repeated cyclically, each number corresponding to one phase of the dither.

7. The means of claim 6
wherein one addend number of the cycle is zero and contemporaneous with a first dither phase;
wherein another addend number is N and contemporaneous with another dither phase; and
wherein said means for modifying signals effectively transforms the first-phase size of a dither sample so that its size during said other phase is the logical binary sum of the first-phase size and N.

8. The means of claim 6 wherein each dither sample having a given size moves to successive horizontally vertically or diagonally adjacent positions on the array corresponding to pels of the scanning raster for successive changes of frame pattern, and all samples move in concert along parallel paths.

9. The means of claim 6 wherein p is 16 and the letters A,B,C,D, E,F,G,H, I,J,K,L, M,N,O,P designate said cyclically repeating addend numbers when:
a) A=0, E=2, I=1, M=3;
b) the ordered set C,G,K,O corresponds to any consecutive set of four numbers, reading either left-to-right or right-to-left, from the series 4,6,5,7,4,6,5,7;
c) the ordered set B,F,J,N corresponds to any consecutive set of four numbers, reading either way, from the series 8,10,9,11,8,10,9,11; and
d) the ordered set D,H,L,P corresponds to a like set from 12,14,13,15,12,14,13,15.

10. The means of claim 6 wherein p is 16 and the letters A,B,C,D, E,F,G,H, I,J,K,L, M,N,O,P designate said cyclically repeating addend numbers when:
a) A=0, E=2, I=1, M=3;
b) the ordered set C,G,K,O corresponds to any consecutive set of four numbers, reading either left-to-right or right-to-left, from the series 4,6,5,7,4,6,5,7;
c) the ordered set D,H,L,P corresponds to any consecutive set of four numbers, reading either way, from the series 8,10,9,11,8,10,9,11; and
d) the ordered set B,F,J,N corresponds to a like set from 12,14,13,15,12,14,13,15.

11. The means of claim 5 arranged to generate a multiphase dither that is self-interpolating.

12. The means of claim 11 wherein a dither sample having a specific size moves to successive horizontally vertically or diagonally adjacent positions on the array corresponding to pels of the scanning raster for successive changes of frame pattern.

13. The means of claim 12 wherein all dither samples, rotate about a closed path during a cycle of frame changes.

14. A system for transmitting television information comprising:
means for deriving a signal corresponding to a video component;
means for deriving a stream of dither samples corresponding to a multiphase dither of claim 5;
means for combining dither samples of said stream with samples of said video component; and
means for quantizing the combined samples according to discrete quantum levels.

15. A method for producing a multi-phase dither comprising the steps of:
a) providing a cyclic sequence of addend numbers, each number corresponding to one phase of the dither;
b) providing another sequence of dither samples corresponding to multiple dither sizes, said another sequence conforming to a single phase of the dither;
c) causing said another sequence to repeat continually;
d) generating one dither phase by modifying sizes of dither samples of said another sequence according to logical binary addition of a first addend number to each size; and
d) generating the next dither phase by modifying sizes of dither samples of said another sequence according to logical binary addition of the next addend number to each size.

16. The method of claim 15 providing a cyclic sequence of addend numbers according to rules sufficient to produce a self-interpolating multi-phase dither.

17. The method of claim 15 providing a cyclic sequence of sixteen addend numbers, arranged according to rules sufficient to produce a self-interpolating 16-phase dither.

18. The method of claim 17 providing 16-phase self-interpolating dither by means of the sequence of logical binary addends 0,8,4,12,2,10,6,14,1,9,5,12,3,11,7,15 repeated cyclically.

19. A system for transmitting television information comprising:
means for deriving a signal corresponding to a video component;
means for deriving a stream of dither samples corresponding to a multiphase dither produced by the method of claim 15;
means for combining dither samples of said stream with samples of said video component; and
means for quantizing the combined samples according to discrete quantum levels.

20. Means for generating a dither having translated frame patterns suitable for dither-quantizing a television signal, comprising:
means for storing information corresponding to a 2-dimensional array of dither samples, said array larger than a frame pattern in height and width;
means for extracting information that effectively scans a portion of said array according to a predetermined scanning pattern in order to read out one frame pattern of said dither; and
means for extracting information that effectively scans another portion of said array according to the same predetermined scanning pattern to read out another frame pattern of said dither.

* * * * *

UNITED STATES PATENT AND TRADEMARK OFFICE
CERTIFICATE OF CORRECTION

PATENT NO. : 5,148,273

DATED : August 20, 1991

INVENTOR(S) : Jacques Thimon

It is certified that error appears in the above-identified patent and that said Letters Patent is hereby corrected as shown below:

Column 1, line 63: Delete "to".

Column 1, line 67: Between "restricted" and "Q", insert -- to --.

Column 3, line 46: After "receiver", insert period. Then start new paragraph, inserting the words --- Assume a monochromatic display, -- at the beginning of the paragraph.

UNITED STATES PATENT AND TRADEMARK OFFICE
CERTIFICATE OF CORRECTION

PATENT NO. : 5,148,273

DATED : August 20, 1991

INVENTOR(S) : Jacques Thimon

It is certified that error appears in the above-identified patent and that said Letters Patent is hereby corrected as shown below:

Column 8, between lines 3 and 4: Insert erroneously omitted text as follows:

-- It will be apparent to persons having reasonable skill in the art that the sequences of addends that obey the herein-disclosed rules for self-interpolating dithers with 16, 8 or 4 phases can be found conveniently by means of the following schema, which is equivalent to the rules:

1) Array the addends 0-15, either thus

```
0  8 4 12
2 10 6 14   (Array A)
1  9 5 13
3 11 7 15
``` or in an equivalent array. An equivalent array has one or more columns of A altered by rotation and/or reversal of the sequence of addends in the column. For example, Arrays B and C are equivalent to Array A.

UNITED STATES PATENT AND TRADEMARK OFFICE
CERTIFICATE OF CORRECTION

PATENT NO. : 5,148,273
DATED : August 20, 1991
INVENTOR(S) : Jacques Thimon

It is certified that error appears in the above-identified patent and that said Letters Patent is hereby corrected as shown below:

```
0 10 4 12              0  8 7 15
2  8 6 14  (Array B)   3 11 4 12  (Array C)
1 11 5 13              1  9 6 14
3  9 7 15              2 10 5 13
```

Column 8, line 4 (New Par.): Before first word, insert -- 2) --.

Column 6, line 3-4: Correct spelling to -- Canonical --.

Column 7, line 54: Correct spelling to --iterated--.

Col.8, line 62 (Claim 5): Replace "P" with --p--.

Signed and Sealed this

Twenty-seventh Day of April, 1993

Attest:

MICHAEL K. KIRK

Attesting Officer     Acting Commissioner of Patents and Trademarks